(12) United States Patent
Kunai

(10) Patent No.: US 10,132,975 B2
(45) Date of Patent: Nov. 20, 2018

(54) POLARIZING PLATE HAVING A PHOTO-CURABLE ADHESIVE

(71) Applicant: Sumitomo Chemical Company, Limited, Tokyo (JP)

(72) Inventor: Yuichiro Kunai, Arlington, MA (US)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 239 days.

(21) Appl. No.: 15/107,957

(22) PCT Filed: Dec. 19, 2014

(86) PCT No.: PCT/JP2014/083672
§ 371 (c)(1),
(2) Date: Jun. 24, 2016

(87) PCT Pub. No.: WO2015/098734
PCT Pub. Date: Jul. 2, 2015

(65) Prior Publication Data
US 2016/0320538 A1    Nov. 3, 2016

(30) Foreign Application Priority Data

Dec. 26, 2013 (JP) .................................. 2013-269552

(51) Int. Cl.
*G02B 5/30* (2006.01)
*B32B 7/12* (2006.01)
(Continued)

(52) U.S. Cl.
CPC .............. *G02B 5/3033* (2013.01); *B32B 7/12* (2013.01); *B32B 27/08* (2013.01); *B32B 27/306* (2013.01);
(Continued)

(58) Field of Classification Search
CPC ... G02B 1/00; G02B 1/08; G02B 1/10; G02B 1/105; G02B 1/14; G02B 5/208;
(Continued)

(56) References Cited

U.S. PATENT DOCUMENTS 8,305,683 B2 * 11/2012 Asano .................. G02B 5/3058
359/352
2013/0208201 A1 * 8/2013 Satoh ..................... G02F 1/1334
349/33
(Continued)

FOREIGN PATENT DOCUMENTS

CN      103298897 A    9/2013
JP      H 01240517 A   9/1989
(Continued)

OTHER PUBLICATIONS

Int'l Search Report dated Mar. 3, 2015 in Int'l Application No. PCT/JP2014/083672.
(Continued)

*Primary Examiner* — Arnel C Lavarias
(74) *Attorney, Agent, or Firm* — Panitch Schwarze Belisario & Nadel LLP

(57) ABSTRACT

A polarizer having a maximum absorbance at wavelengths from 280 to 320 nm is less than or equal to 0.70. A polarizing plate including the polarizer and a protective film disposed on the polarizer with an adhesive layer of a cured product of a light-transmitting adhesive being interposed. A polarizing laminated film including a substrate film and the polarizer provided on each of opposing surfaces of the substrate film.

9 Claims, 7 Drawing Sheets

(51) Int. Cl.
  *B32B 27/08* (2006.01)
  *B32B 27/30* (2006.01)
  *G02B 1/14* (2015.01)

(52) U.S. Cl.
  CPC ............ *G02B 5/305* (2013.01); *G02B 5/3075* (2013.01); *B32B 2307/42* (2013.01); *B32B 2457/202* (2013.01); *G02B 1/14* (2015.01)

(58) Field of Classification Search
  CPC . G02B 5/22; G02B 5/223; G02B 5/30; G02B 5/3083; G02B 5/3091; G02B 5/3008; G02B 5/3025; G02B 27/28; G02B 28/286; G02B 27/288
  USPC .... 359/483.01, 487.01, 487.02, 487.05, 350, 359/352; 362/19; 353/20
  See application file for complete search history.

(56) References Cited

U.S. PATENT DOCUMENTS

| | | | |
|---|---|---|---|
| 2013/0293949 A1 | 11/2013 | Saito et al. | |
| 2015/0049380 A1 | 2/2015 | Takeda et al. | |
| 2016/0003995 A1* | 1/2016 | Nakazawa | H01L 51/5293 359/488.01 |
| 2016/0062020 A1* | 3/2016 | Kogure | G02B 5/3083 359/489.07 |

FOREIGN PATENT DOCUMENTS

| | | |
|---|---|---|
| JP | H 03-14882 A | 1/1991 |
| JP | H 03-122137 A | 5/1991 |
| JP | H10090517 A | 4/1998 |
| JP | 2008170717 A | 7/2008 |
| JP | 2009109994 A | 5/2009 |
| JP | 2009134121 A | 6/2009 |
| JP | 2009139585 A | 6/2009 |
| JP | 2010091602 A | 4/2010 |
| JP | 2010091603 A | 4/2010 |
| JP | 2012144690 A | 8/2012 |
| JP | 2012159778 A | 8/2012 |
| JP | 2012203211 A | 10/2012 |
| JP | 201361365 A | 4/2013 |
| JP | 2013210513 A | 10/2013 |
| JP | 2013228726 A | 11/2013 |
| KR | 20100036960 A | 4/2010 |
| KR | 20100038147 A | 4/2010 |
| KR | 20120002815 A | 1/2012 |
| TW | 201022741 A | 6/2010 |
| TW | 201231603 A | 8/2012 |
| TW | 201240807 A | 10/2012 |

OTHER PUBLICATIONS

Office Action dated Oct. 30, 2017 in CN Application No. 2014-80071287.5.
Office Action dated Oct. 30, 2017 in KR Application No. 10-2016-7019490.
Search Report dated Feb. 20, 2017 in relation to KR Application No. 20167019490.
Office Action dated Mar. 21, 2017 in JP Application No. 2015-554828.
Office Action dated Jun. 14, 2017 in KR Application No. 10-2016-7019490.
Decision to Grant a Patent dated Dec. 19, 2017 in JP Application No. 2015554828.
Office Action dated Aug. 8, 2017 in JP Application No. 2015-554828.
Office Action dated Mar. 2, 2018 in TW Application No. 103145448.
Office Action dated Jul. 5, 2018 in CN Application No. 201480071287.5.

* cited by examiner

POLARIZING PLATE HAVING A PHOTO-CURABLE ADHESIVE

CROSS-REFERENCE TO RELATED APPLICATION

This application is a Section 371 of International Application No. PCT/JP2014/083672, filed Dec. 19, 2014, which was published in the Japanese language on Jul. 2, 2015, under International Publication No. WO 2015/098734 A1, and the disclosure of which is incorporated herein by reference.

TECHNICAL FIELD

The present invention relates to a polarizer, as well as a polarizing plate and a polarizing laminated film including the polarizer.

BACKGROUND ART

Polarizing plates are widely used in displays such as liquid crystal displays and particularly in recent years, in a variety of mobile devices such as smartphones and slate PCs. In general, a polarizing plate has a protective film bonded to one surface or opposing surfaces of a polarizer with an adhesive.

PTDs 1 to 8 (Japanese Patent Laying-Open Nos. 2013-228726, 2013-210513, 2012-144690, 2009-109994, 2009-139585, 2010-091603, 2010-091602, and 2008-170717) each describe a polarizing plate obtained by bonding a protective film to a polarizer with a photo-curable adhesive.

CITATION LIST

Patent Literature

PTD 1: Japanese Patent Laying-Open No. 2013-228726
PTD 2: Japanese Patent Laying-Open No. 2013-210513
PTD 3: Japanese Patent Laying-Open No. 2012-144690
PTD 4: Japanese Patent Laying-Open No. 2009-109994
PTD 5: Japanese Patent Laying-Open No. 2009-139585
PTD 6: Japanese Patent Laying-Open No. 2010-091603
PTD 7: Japanese Patent Laying-Open No. 2010-091602
PTD 8: Japanese Patent Laying-Open No. 2008-170717

SUMMARY OF INVENTION

Technical Problem

Instead of a material relatively high in moisture permeability which can be bonded by using a water-based adhesive such as a cellulose based resin, materials lower in moisture permeability such as a cyclo-olefin based resin, an olefin based resin, an acrylic resin, and a polyethylene terephthalate based resin have recently been used for a protective film of a polarizer. Since such materials low in moisture permeability cannot sufficiently be adhered to a polarizer even with the use of a water-based adhesive, they are often adhered to the polarizer with the use of a photo-curable adhesive.

When a photo-curable adhesive is used, a layer of a cured adhesive may be deteriorated by light. Therefore, in order to be able to ensure resistance to light when the adhesive is incorporated in a display apparatus, for example, an ultraviolet ray absorber is desirably contained in a protective film. For example, a coating-type retardation film may be formed on a surface of a protective film. In those cases, a transmittance to ultraviolet rays on a side of the protective film is significantly low, and disadvantageously, irradiation with light from the side of the protective film cannot achieve sufficient curing of the adhesive.

In connection with a method of overcoming such a disadvantage, a technique to use as a component of a photo-curable adhesive, a photopolymerization initiator or a photosensitizer having an absorption band in a range of wavelengths approximately from 370 to 420 nm closer to visible light is exemplified as a known technique. With this technique, however, a range of absorption wavelengths of a photopolymerization initiator or a photosensitizer expands to a visible light region, and hence such a disadvantage as coloring of a polarizing plate itself and resultant failure in keeping the polarizing plate in a neutral hue (without coloring) may occur. Even though a polarizing plate having a neutral hue can be obtained in an initial stage, reaction of an unreacted initiator may gradually proceed owing to external light and the hue may deviate from a designed value after the polarizing plate is incorporated in a display apparatus.

In view of the problems above, an object of the present invention is to provide a polarizer capable of keeping a neutral hue in which a photo-curable adhesive has sufficiently been cured by irradiation with light, as well as a polarizing plate and a polarizing laminated film including the polarizer.

Solution to Problem

[1] A polarizer, having maximum absorbance at wavelengths from 280 to 320 nm being less than or equal to 0.70.

[2] A polarizing plate including the polarizer according to [1] and a protective film disposed on the polarizer with an adhesive layer of a cured product of a photo-curable adhesive being interposed.

[3] The polarizing plate according to [2], wherein a light transmittance at a wavelength of 365 nm of the protective film is less than 5%.

[4] The polarizing plate according to [2] or [3], wherein the photo-curable adhesive contains a photopolymerization initiator having a maximum absorption wavelength within a range from 280 to 320 nm.

[5] The polarizing plate according to any of [2] to [4], wherein the polarizer has a thickness less than or equal to 10 μm.

[6] A polarizing laminated film including a substrate film and the polarizer according to [1] provided on each of opposing surfaces of the substrate film.

Advantageous Effects of Invention

According to the present invention, a polarizer capable of keeping a neutral hue in which a photo-curable adhesive has sufficiently been cured by irradiation with light as well as a polarizing plate and a polarizing laminated film including the polarizer can be provided.

DESCRIPTION OF EMBODIMENTS

<Polarizing Plate>

Figure 1:
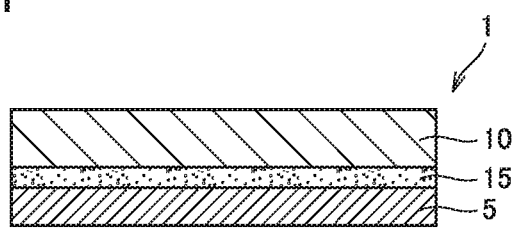
FIG. 1 is a schematic cross-sectional view showing an example of a layered structure of a polarizing plate according to the present invention.
Figure 2:
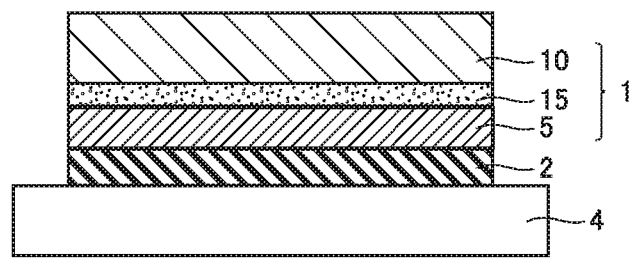
FIG. 2 is a schematic cross-sectional view showing the polarizing plate shown in FIG. 1 being arranged on a cell for display.

FIG. 1 is a schematic cross-sectional view showing an example of a layered structure of a polarizing plate according to the present invention. Likewise a polarizing plate 1 shown in FIG. 1, a polarizing plate according to the present invention can be a single side protective film-bearing polarizing plate including a polarizer 5 and a protective film 10 disposed on one surface thereof with an adhesive layer 15 being interposed. FIG. 2 is a schematic cross-sectional view showing the polarizing plate shown in FIG. 1 being arranged on a cell for display. As shown in FIG. 2, protective film 10 is arranged on the outer side when polarizing plate 1 is arranged on a cell for display 4, and typically forms an outermost surface when polarizing plate 1 is arranged on cell for display 4. Polarizing plate 1 can be arranged and bonded on cell for display 4 with the use of a pressure-sensitive adhesive layer 2 provided on an outer surface of polarizer 5.

(1) Polarizer

In the present invention, a maximum absorbance at wavelengths from 280 to 320 nm of a polarizer is less than or equal to 0.70 and more preferably less than or equal to 0.68.

Here, an absorbance is a value which can be obtained through measurement using an absorption photometer and is calculated from an expression below by measuring intensity of transmitted light at the time when natural light (light having a wavelength from 280 to 320 nm) is incident as incident light on a sample (polarizer):

Absorbance=$-\log_{10}(T/T_0)$ where $T_0$ represents intensity of incident light and T represents intensity of transmitted light.

A result of measurement of an absorbance of a polarizer varies depending on a state of polarization of incident light. For example, attention should be paid during measurement because, in some absorbance photometers, some polarization is caused due to influence of a mirror or an optical element located between a light source and a sample or a polarized light separating element such as a prism is interposed. When such measurement instruments are used, influence by a polarization direction of incident light can be eliminated by conducting measurement involved with a polarizer at a certain angle, then conducting measurement involved with the same polarizer again in a direction rotated by 90 degrees, and calculating an absorbance from an average value of intensities of transmitted light.

By employing such a polarizer, when a photo-curable adhesive is irradiated with ultraviolet rays (such as UV-B) from the side of the polarizer while a protective film is disposed on the polarizer with the adhesive being interposed, the ultraviolet rays readily pass through the polarizer and hence an adhesive layer resulting from a sufficiently cured photo-curable adhesive is formed.

Since curing of the photo-curable adhesive efficiently proceeds also with incident light from the side of the polarizer in adhesion between the protective film and the polarizer, the polarizing plate can be produced in a stable manner regardless of a type of the protective film. This effect is noticeable in particular when a polarizer not greater than 10 μm is made. In order to make a polarizer not greater than 10 μm, a method for producing a polarizer (a polarizing laminated film including a substrate film and the polarizer provided on each of opposing surfaces of the substrate film) by applying a coating liquid onto a substrate film to thereby form a polyvinyl alcohol based resin layer and stretching the substrate as a whole is preferably employed. Here, for prevention of curling, the polyvinyl alcohol based resin layer may be provided on opposing surfaces of the substrate film. In this case, since the photo-curable adhesive should be irradiated with ultraviolet rays through two polarizers, such an effect of the present invention is particularly useful.

Polarizer 5 has a thickness preferably less than or equal to 10 μm and more preferably less than or equal to 7 μm. Polarizer 5 having a thickness less than or equal to 10 μm is advantageous in decrease in thickness of a polarizing plate.

Polarizer 5 may be a uniaxially stretched polyvinyl alcohol-based resin layer having a dichroic dye adsorbed and oriented in the layer. The polyvinyl alcohol-based resin used to constitute the polyvinyl alcohol-based resin layer may be a product obtained by saponifying a polyvinyl acetate-based resin. Examples of the polyvinyl acetate-based resin include polyvinyl acetate that is a homopolymer of vinyl acetate, and a copolymer of vinyl acetate and other monomers copolymerizable therewith. Examples of other monomers copolymerizable with vinyl acetate include unsaturated carboxylic acids, olefins, vinyl ethers, unsaturated sulfonic acids, and ammonium group-containing acrylamides.

The polyvinyl alcohol-based resin is subjected to film formation to form polarizer 5. The method for subjecting the polyvinyl alcohol-based resin to film formation is not particularly limited and may be a known method. In order to easily form polarizer 5 having a thickness less than or equal to 10 μm, a solution of the polyvinyl alcohol-based resin is preferably applied onto a substrate film to form a film.

Polarizer 5 needs to have undergone stretching for orientation. Polarizer 5 is stretched to a stretch ratio of preferably more than 5 and to a stretch ratio of more preferably more than 5 and less than or equal to 17.

The polyvinyl alcohol-based resin may have a saponification degree in the range of 80.0 to 100.0 mol %, preferably in the range of 90.0 to 99.5 mol %, and more preferably in the range of 94.0 to 99.0 mol %. If the saponification degree is less than 80.0 mol %, resulting polarizing plate 1 may have reduced resistance to water and moist heat. If the polyvinyl alcohol-based resin used has a saponification degree greater than 99.5 mol %, the speed of dyeing the resin may be low so that the productivity may decrease and resulting polarizer 5 may fail to have sufficient polarizing performance.

The saponification degree is a unit ratio (mol %) representing a rate of conversion from acetic acid groups (acetoxy groups (—OCOCH$_3$)) in a polyvinyl acetate-based resin as a raw material for the polyvinyl alcohol-based resin into hydroxyl groups by a saponification process. This is defined by the following formula.

Saponification degree (mol %)=100×(the number of hydroxyl groups)÷(the number of hydroxyl groups+the number of acetic acid groups)

A saponification degree can be determined according to JIS K 6726 (1994). A higher saponification degree indicates a higher hydroxyl group content and thus indicates a lower content of acetic acid groups capable of inhibiting crystallization.

The polyvinyl alcohol-based resin may be modified polyvinyl alcohol obtained by partially modifying polyvinyl alcohol. Examples of the modified polyvinyl alcohol include those obtained by modifying a polyvinyl alcohol-based resin with an olefin such as ethylene or propylene, an unsaturated carboxylic acid such as acrylic acid, methacrylic acid, or crotonic acid, an alkyl ester of an unsaturated carboxylic acid, or acrylamide. The modification rate is preferably less than 30 mol % and more preferably less than 10%. If modification is performed at a rate higher than 30 mol %, the modified product is less likely to adsorb a dichroic dye and resulting polarizer 5 may fail to have sufficient polarizing performance.

The polyvinyl alcohol-based resin preferably has an average polymerization degree of 100 to 10000, more preferably 1500 to 8000, and even more preferably 2000 to 5000. The average polymerization degree of the polyvinyl alcohol-based resin can be determined also according to JIS K 6726 (1994).

Examples of commercially available products of the polyvinyl alcohol-based resin suitably used in the present invention include PVA 124 (saponification degree: 98.0-99.0 mol %), PVA 117 (saponification degree: 98.0-99.0 mol %), PVA 624 (saponification degree: 95.0-96.0 mol %), and PVA 617 (saponification degree: 94.5-95.5 mol %) manufactured by KURARAY Co., Ltd.; AH-26 (saponification degree: 97.0-98.8 mol %), AH-22 (saponification degree: 97.5-98.5 mol %), NH-18 (saponification degree: 98.0-99.0 mol %), and N-300 (saponification degree: 98.0-99.0 mol %) manufactured by The Nippon Synthetic Chemical Industry Co., Ltd.; and JC-33 (saponification degree: greater than or equal to 99.0 mol %), JM-33 (saponification degree: 93.5-95.5 mol %), JM-26 (saponification degree: 95.5-97.5 mol %), JP-45 (saponification degree: 86.5-89.5 mol %), JF-17 (saponification degree: 98.0-99.0 mol %), JF-17L (saponification degree: 98.0-99.0 mol %), and JF-20 (saponification degree: 98.0-99.0 mol %) manufactured by JAPAN VAM & POVAL Co., Ltd., all of which are trademarks.

The dichroic dye contained (adsorbed and oriented) in polarizer 5 can be iodine or a dichroic organic dye. Specific examples of the dichroic organic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black. One dichroic dye may be used alone, or two or more dichroic dyes may be used in combination.

(2) Protective Film

Protective film 10 can be a transparent resin film composed of a thermoplastic resin, such as a polyolefin-based resin such as an acyclic polyolefin-based resin (such as a polypropylene-based resin) or a cyclic polyolefin-based resin (such as a norbornene-based resin); a cellulose ester-based resin such as cellulose triacetate or cellulose diacetate; a polyester-based resin such as polyethylene terephthalate, polyethylene naphthalate, or polybutylene terephthalate; a polycarbonate-based resin; a (meth)acrylic resin; or any mixture or copolymer thereof.

A cyclic polyolefin-based resin is a generic name for resins obtained by polymerization of cyclic olefins as polymerization units, such as resins disclosed in Japanese Patents Laying-Open Nos. H01-240517, H03-14882, and H03-122137. Specific examples of the cyclic polyolefin-based resin include ring-opened (co)polymers of cyclic olefins, addition polymers of cyclic olefins, copolymers (typically random copolymers) of cyclic olefins and chain olefins such as ethylene and propylene, graft polymers obtained by modifying these polymers with an unsaturated carboxylic acid or a derivative thereof, and hydrides thereof. In particular, norbornene-based resins containing a norbornene monomer, such as norbornene or a polycyclic norbornene monomer, as the cyclic olefin are preferably used.

Various products of a cyclic polyolefin-based resin are commercially available. Examples of commercially available products of the cyclic polyolefin-based resin include Topas (manufactured by Topas Advanced Polymers GmbH and available from Polyplastics Co., Ltd.), ARTON (manufactured by JSR Corporation), ZEONOR (manufactured by Zeon Corporation), ZEONEX (manufactured by Zeon Corporation), and APEL (manufactured by Mitsui Chemicals, Inc.), all of which are trademarks.

The protective film may also be a commercially available product produced by forming a cyclic polyolefin-based resin into a film, such as Escena (manufactured by Sekisui Chemical Co., Ltd.), SCA40 (manufactured by Sekisui Chemical Co., Ltd.), and ZEONOR Film (manufactured by Zeon Corporation), all of which are trademarks.

The cellulose ester-based resin is an ester of cellulose and a fatty acid. Specific examples of the cellulose ester-based resin include cellulose triacetate, cellulose diacetate, cellulose tripropionate, and cellulose dipropionate. Copolymers of these resins or resins obtained by partially modifying hydroxyl groups of these resins with other substituents can also be used. Among them, cellulose triacetate (triacetylcellulose (TAC)) is particularly preferred. There are many commercially available products of cellulose triacetate, and the products are also advantageous in terms of easy availability and cost. Examples of commercially available products of cellulose triacetate include FUJITAC TD80 (manufactured by FUJIFILM Corporation), FUJITAC TD80UF (manufactured by FUJIFILM Corporation), FUJITAC TD80UZ (manufactured by FUJIFILM Corporation), FUJITAC TD40UZ (manufactured by FUJIFILM Corporation), KC8UX2M (manufactured by Konica Minolta Opto Co., Ltd.), and KC4UY (manufactured by Konica Minolta Opto Co., Ltd.), all of which are trademarks.

Protective film 10 can also be a protective film capable of also having an optical function, such as a retardation film or a brightness enhancement film. For example, the transparent resin film made of the above material may be stretched (uniaxially or biaxially stretched) or coated with a liquid crystal layer to form a retardation film with any retardation value.

A light transmittance at a wavelength of 365 nm of protective film 10 is preferably lower than 5%. In this case, a transmittance of a protective film to ultraviolet rays (rays having a wavelength from 280 to 320 nm, such as UV-B) shorter in wavelength is also low. Therefore, when an adhesive is to be cured by irradiation with ultraviolet rays (such as UV-B) while a protective film is disposed on a polarizer with a photo-curable adhesive being interposed, the photo-curable adhesive cannot be cured by irradiation with ultraviolet rays from the side of the protective film. Therefore, in this case, in particular, a property of a polarizer to transmit light having a wavelength from 280 to 320 nm (UV-B) should be high (an absorbance should be low). According to the present invention, even when a protective film is low in property to transmit ultraviolet rays as such, a property of a polarizer to transmit ultraviolet rays is high. Therefore, an adhesive layer resulting from a sufficiently cured photo-curable adhesive can be formed by irradiation with ultraviolet rays from the side of the polarizer (opposite to the protective film).

From a point of view of decrease in thickness of a polarizing plate, protective film 10 has a thickness preferably less than or equal to 80 μm, more preferably less than or equal to 60 μm, and further preferably less than or equal to 50 μm. From a point of view of ensured strength of the film, protective film 10 has a thickness normally greater than or equal to 5 μm.

A surface treatment layer (coating layer) such as a hard coat layer, an antiglare layer, an antireflection layer, an antistatic layer, or an antifouling layer can also be formed on the surface of protective film 10 opposite to polarizer 5. The method used to form the surface treatment layer on the protective film surface is not particularly limited and may be a known method.

(3) Adhesive Layer

Adhesive layer 15 is a layer of a cured product of a photo-curable adhesive.

The photo-curable adhesive refers to an adhesive capable of being cured by exposure to active energy rays such as ultraviolet rays, examples of which can include an adhesive containing a polymerizable compound and a photopolymerization initiator, an adhesive containing a photoreactive resin, and an adhesive containing a binder resin and a photoreactive cross-linking agent. The photo-curable adhesive is advantageous in that 1) it does not require a drying step because it can be prepared as a solventless adhesive and 2) it can be used for bonding of a protective film low in moisture permeability so that it can adapt to bonding of a wider variety of protective films than a water-based adhesive.

Examples of the polymerizable compound can include a photo-curable epoxy-based compound, a photo-curable vinyl compound such as a photo-curable acrylic compound, and a photo-curable urethane-based compound.

Examples of the photopolymerization initiator can include a photo-cationic polymerization initiator (for example, in the case where a photo-curable epoxy-based compound is used) and a photo-radical polymerization initiator (for example, in the case where a photo-curable acrylic compound is used).

A maximum absorption wavelength of a photopolymerization initiator contained in a photopolymerizable adhesive used for adhesion between a protective film and a polarizer is preferably in a range between 280 and 320 nm. In this case, since a photopolymerization initiator and a photosensitizer on a shorter wavelength side than visible light can be used, deterioration by visible light after the adhesive is incorporated in a display apparatus is less likely and hence a polarizing plate excellent in resistance to light can be provided.

(4) Pressure-Sensitive Adhesive Layer

Pressure-sensitive adhesive layer 2 for bonding polarizing plate 1 to another member (such as cell for display 4 of a display apparatus) may also be disposed on an outer surface (a surface opposite to adhesive layer 15) of polarizer 5 as shown in FIG. 2.

A pressure-sensitive adhesive used to form pressure-sensitive adhesive layer 2 is normally composed of a pressure-sensitive adhesive composition produced by adding a cross-linking agent such as an isocyanate compound, an epoxy compound, or an aziridine compound to a (meth) acrylic resin, a styrene-based resin, a silicone-based resin, or other base polymers The pressure-sensitive adhesive layer may further contain fine particles to have light-scattering properties.

Although pressure-sensitive adhesive layer 2 can have a thickness of 1 to 40 μm, it is preferably formed to have a small thickness so long as its properties such as workability and durability are not impaired. Specifically, the pressure-sensitive adhesive layer preferably has a thickness of 3 to 25 μm. The thickness of 3 to 25 μm is also suitable in order to provide good workability and control dimensional changes of polarizer 5. Pressure-sensitive adhesive layer 2 with a thickness less than 1 μm may have reduced tackiness, and the pressure-sensitive adhesive layer with a thickness greater than 40 μm may easily suffer from a defect such as oozing of the pressure-sensitive adhesive.

A method for forming pressure-sensitive adhesive layer 2 is not particularly limited. The pressure-sensitive adhesive layer may be formed by applying a pressure-sensitive adhesive composition (pressure-sensitive adhesive solution) to the surface of polarizer 5, the composition containing components including the base polymer mentioned above, and drying the composition. Alternatively, pressure-sensitive adhesive layer 2 may be formed on a separator (release film) and then transferred onto polarizer 5. If necessary, a surface treatment such as a corona treatment may be performed on the surface of polarizer 5 or the surface of pressure-sensitive adhesive layer 2 in the process of forming pressure-sensitive adhesive layer 2 on the surface of polarizer 5.

(5) Optical Layer

Polarizing plate 1 can further include an additional optical layer disposed on protective film 10 or polarizer 5. The additional optical layer may be a reflective polarizing film allowing passage of a certain type of polarized light and reflecting polarized light of a type reverse thereto, a film with an antiglare function having irregularities on its surface, a film with a surface reflection-preventing function, a reflective film having a surface reflecting function, a translucent reflective film having both of reflecting and transmitting functions, or a viewing angle compensation film.

Examples of a commercially available product corresponding to the reflective polarizing film allowing passage of a certain type of polarized light and reflecting polarized light of a type reverse thereto include DBEF (manufactured by 3M Company and available from Sumitomo 3M Limited in Japan) and APF (manufactured by 3M Company and available from Sumitomo 3M Limited in Japan).

Examples of the viewing angle compensation film include an optical compensation film having a liquid crystalline compound applied, oriented, and fixed onto the surface of a substrate, a retardation film including a polycarbonate-based resin, and a retardation film including a cyclic polyolefin-based resin.

Examples of a commercially available product corresponding to the optical compensation film having a liquid crystalline compound applied, oriented, and fixed onto the surface of a substrate include WV Film (manufactured by FUJIFILM Corporation), NH Film (manufactured by JX Nippon Oil & Energy Corporation), and NR Film (manufactured by JX Nippon Oil & Energy Corporation).

Examples of a commercially available product corresponding to the retardation film including a cyclic polyolefin-based resin include ARTON Film (manufactured by JSR Corporation), Escena (manufactured by Sekisui Chemical Co., Ltd.), and ZEONOR Film (manufactured by Zeon Corporation).

<Method of Producing Polarizing Plate>

Figure 3:
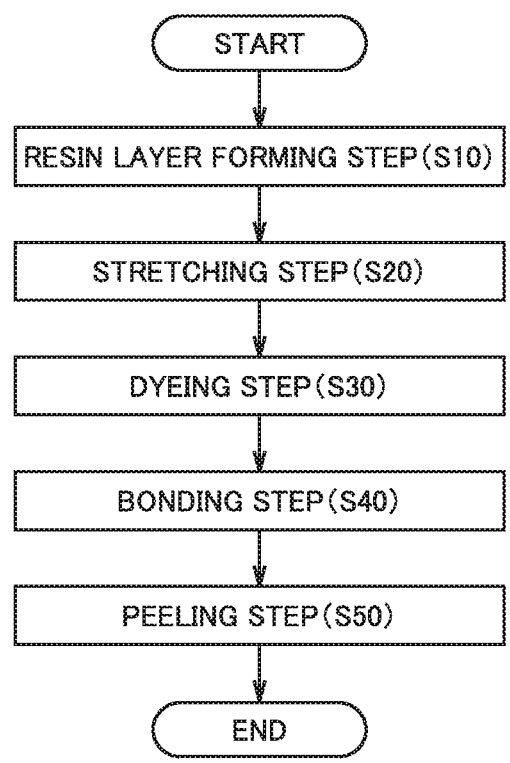
FIG. 3 is a flowchart showing a preferred example of a method for producing a polarizing plate according to the present invention.

The polarizing plate of the present invention can suitably be produced, for example, with the method shown in FIG. 3. The method for producing the polarizing plate shown in FIG. 3 is a method for producing protective film-bearing polarizing plate 1, and includes, in this order, the following steps:

(1) a resin layer forming step S10 that includes applying a polyvinyl alcohol-based resin-containing coating liquid to at least one surface of a substrate film and then drying the coating to form a polyvinyl alcohol-based resin layer, so that a laminated film is obtained;

(2) a stretching step S20 that includes stretching the laminated film to obtain a stretched film;

(3) a dyeing step S30 that includes dyeing the polyvinyl alcohol-based resin layer of the stretched film with a dichroic dye to form a polarizer, so that a polarizing laminated film is obtained;

(4) a bonding step S40 that includes bonding any one of protective films onto the polarizer of the polarizing laminated film with an adhesive layer being interposed, to obtain a laminate film; and (5) a peeling step S50 that includes peeling off the substrate film from the laminate film to obtain a single side protective film-bearing polarizing plate.

Hereinafter, each step will be described with reference to FIGS. 4 to 7. The same or corresponding elements in the drawings have the same reference numerals allotted.

(1) Resin Layer Forming Step S10

Figure 4:
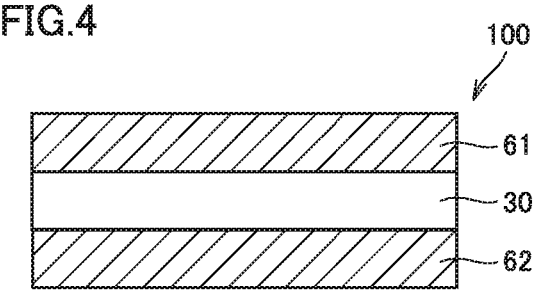
FIG. 4 is a schematic cross-sectional view showing an example of a layered structure of a laminated film obtained in a resin layer forming step.

Referring to FIG. 4, the present step includes forming respective polyvinyl alcohol-based resin layers 61 and 62 on both surfaces of a substrate film 30 to obtain a laminated film 100. Polyvinyl alcohol-based resin layers 61 and 62 are to be turned into polarizers 51 and 52 through stretching step S20 and dyeing step S30. Polyvinyl alcohol-based resin layers 61 and 62 can be formed by applying a polyvinyl alcohol-based resin-containing coating liquid to both surfaces of substrate film 30 and drying the coating layer. Such a method of forming the polyvinyl alcohol-based resin layer by coating is advantageous in that it can easily form polarizers 51 and 52 having a small thickness.

[Substrate Film]

Substrate film 30 can be composed of a thermoplastic resin. In particular, substrate film 30 is composed preferably of a thermoplastic resin with a high level of transparency, mechanical strength, thermal stability, stretchability, and other properties. Specific examples of such a thermoplastic resin include a polyolefin-based resin such as an acyclic polyolefin-based resin or a cyclic polyolefin-based resin (such as a norbornene-based resin), a polyester-based resin, a (meth)acrylic resin, a cellulose ester-based resin such as cellulose triacetate or cellulose diacetate, a polycarbonate-based resin, a polyvinyl alcohol-based resin, a polyvinyl acetate-based resin, a polyarylate-based resin, a polystyrene-based resin, a polyethersulfone-based resin, a polysulfone-based resin, a polyamide-based resin, a polyimide-based resin, and mixtures or copolymers thereof.

Substrate film 30 may have a monolayer structure including a single resin layer of one or more thermoplastic resins or may have a multilayer structure including a stack of resin layers each containing one or more thermoplastic resins. Substrate film 30 is preferably composed of a resin capable of being stretched at a temperature suitable for stretching of polyvinyl alcohol-based resin layers 61 and 62 at the time of stretching of laminated film 100 in stretching step S20 described below.

The acyclic polyolefin-based resin can be a homopolymer of an acyclic olefin, such as a polyethylene resin or a polypropylene resin, or a copolymer of two or more acyclic olefins. Substrate film 30 composed of the acyclic polyolefin-based resin is advantageous in that it can be stably stretched at a high ratio. In particular, substrate film 30 is more preferably composed of a polypropylene-based resin (a polypropylene resin as a homopolymer of propylene or a propylene-based copolymer) or a polyethylene-based resin (a polyethylene resin as a homopolymer of ethylene or an ethylene-based copolymer).

The propylene-based copolymer representing an example of the thermoplastic resin suitably used to compose substrate film 30 is a copolymer of propylene and other monomers copolymerizable therewith.

Examples of other monomers copolymerizable with propylene include ethylene and an α-olefin. The α-olefin is preferably an a-olefin having a carbon number greater than or equal to 4 and more preferably an α-olefin having a carbon number from 4 to 10. Specific examples of the α-olefin having a carbon number from 4 to 10 include linear monoolefins such as 1-butene, 1-pentene, 1-hexene, 1-heptene, 1-octene, and 1-decene; branched monoolefins such as 3-methyl-1-butene, 3-methyl-1-pentene, and 4-methyl-1-pentene; and vinylcyclohexane. The copolymer of propylene and other monomers copolymerizable therewith may be a random copolymer or a block copolymer.

A content of other monomers in the copolymer is, for example, 0.1 to 20% by weight and preferably 0.5 to 10% by weight. The content of other monomers in the copolymer can be determined by performing infrared (IR) spectroscopy according to the method described on page 616 of Kobunshi Bunseki Handbook (Polymer Analysis Handbook) (1995, published by KINOKUNIYA COMPANY Ltd.).

Among the above, a homopolymer of propylene, a propylene-ethylene random copolymer, a propylene-1-butene random copolymer, or a propylene-ethylene-1-butene random copolymer is preferably used as the polypropylene-based resin.

The polypropylene-based resin preferably has substantially isotactic or syndiotactic stereoregularity. Substrate film 30 composed of a polypropylene-based resin having substantially isotactic or syndiotactic stereoregularity has relatively high handleability and high mechanical strength under a high-temperature environment.

The polyester-based resin is a resin having ester bonds, and is generally formed of a polycondensate of a polyvalent carboxylic acid or a derivative thereof and a polyhydric alcohol. The polyvalent carboxylic acid or the derivative thereof may be a bivalent dicarboxylic acid or a derivative thereof, examples of which include terephthalic acid, isophthalic acid, dimethyl terephthalate, and dimethyl naphthalenedicarboxylate. The polyhydric alcohol may be bivalent diol, examples of which include ethylene glycol, propanediol, butanediol, neopentyl glycol, and cyclohexanedimethanol.

A representative example of the polyester-based resin includes polyethylene terephthalate that is a polycondensate of terephthalic acid and ethylene glycol. Although polyethylene terephthalate is a crystalline resin, it may be used before crystallization so that it can easily undergo stretching and other processes. If necessary, polyethylene terephthalate may undergo crystallization during stretching or other processes such as a heat treatment after stretching. A copolymerized polyester is also suitably used. Such a copolymerized polyester is obtained by copolymerizing an additional different monomer into the skeleton of polyethylene terephthalate so that crystallinity is lowered (or the polymer is made amorphous). Examples of such a resin include resins obtained by copolymerization with cyclohexanedimethanol or isophthalic acid. These resins are also suitably used because of their high stretchability.

Specific examples of the polyester-based resin other than polyethylene terephthalate and copolymers thereof include polybutylene terephthalate, polyethylene naphthalate, polybutylene naphthalate, polytrimethylene terephthalate, polytrimethylene naphthalate, polycyclohexane dimethyl terephthalate, polycyclohexane dimethyl naphthalate, and mixtures and copolymers thereof.

The (meth)acrylic resin is a resin composed of a (meth) acryloyl group-containing compound as a main monomer component. Specific examples of the (meth)acrylic resin include poly(meth)acrylates such as polymethyl methacrylate, methyl methacrylate-(meth)acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and copolymers of methyl methacrylate and an alicyclic hydrocarbon group-containing compound (such as methyl methacrylate-cyclohexyl methacrylate copolymers and methyl methacrylate-norbornyl (meth)acrylate copolymers). A polymer composed mainly of poly($C_{1-6}$ alkyl (meth)acrylate) such as polymethyl (meth)acrylate is preferably used, and a methyl methacrylate-based resin mainly composed of methyl methacrylate (50 to 100% by weight and preferably 70 to 100% by weight) is more preferably used.

The polycarbonate-based resin is an engineering plastic composed of a polymer in which monomer units are linked by carbonate groups, and is a resin having a high level of impact resistance, heat resistance, flame retardancy, and transparency. The polycarbonate-based resin used to form substrate film 30 may also be a resin called modified polycarbonate, which has a modified polymer skeleton for reduction in photoelastic coefficient, or a copolymerized polycarbonate with improved wavelength dependency.

There are various commercially available products of the polycarbonate-based resin. Examples of commercially available products of the polycarbonate-based resin include Panlite (manufactured by Teijin Limited), Iupilon (manufactured by Mitsubishi Engineering-Plastics Corporation), SD POLYCA (manufactured by Sumitomo Dow Limited), and CALIBRE (manufactured by The Dow Chemical Company), all of which are trademarks.

Among the above, the polypropylene-based resin is preferably used in view of stretchability and heat resistance.

Description of the protective film is cited here in connection with the cyclic polyolefin-based resin and the cellulose ester-based resin that can be used for substrate film 30. The acyclic polyolefin-based resin, the polyester-based resin, the (meth)acrylic resin, or the polycarbonate-based resin described above in connection with substrate film 30 can also be used to form the protective film.

Substrate film 30 may also contain any appropriate additive in addition to the thermoplastic resin. Examples of such an additive include an ultraviolet absorber, an antioxidant, a lubricant, a plasticizer, a release agent, a discoloration preventing agent, a flame retardant, a nucleating agent, an antistatic agent, a pigment, and a colorant. The content of the thermoplastic resin in substrate film 30 is preferably 50 to 100% by weight, more preferably 50 to 99% by weight, even more preferably 60 to 98% by weight, and particularly preferably 70 to 97% by weight. If the content of the thermoplastic resin in substrate film 30 is less than 50% by weight, high transparency and other properties inherent in the thermoplastic resin may insufficiently be exhibited.

A thickness of substrate film 30 may be determined as appropriate. Generally, in view of strength and workability such as handleability, the thickness of substrate film 30 is preferably 1 to 500 μm, more preferably 1 to 300 μm, even more preferably 5 to 200 μm, and most preferably 5 to 150 μm.

[Polyvinyl Alcohol-Based Resin-Containing Coating Liquid]

A coating liquid is preferably a polyvinyl alcohol-based resin solution obtained by dissolving polyvinyl alcohol-based resin powders in a good solvent (e.g., water). The polyvinyl alcohol-based resin has been described above in detail.

If necessary, the coating liquid may contain an additive such as a plasticizer or a surfactant. The plasticizer may be a polyol or a condensate thereof, examples of which include glycerol, diglycerol, triglycerol, ethylene glycol, propylene glycol, and polyethylene glycol. The additive is suitably added in an amount less than or equal to 20% by weight of the polyvinyl alcohol-based resin.

[Application of Coating Liquid and Drying of Coating Layer]

The method for applying the coating liquid to substrate film 30 can appropriately be selected from among wire bar coating, roll coating such as reverse coating or gravure coating, die coating, comma coating, lip coating, spin coating, screen coating, fountain coating, dipping, spraying, and other methods.

The coating liquid may be applied to both surfaces of substrate film 30. In this case, the coating liquid may be applied to one surface and then the other surface by using any of the above methods, or may be applied simultaneously to both surfaces of substrate film 30 by using dipping, spray coating, or other special devices.

A temperature and a time period for drying the coating layer (the polyvinyl alcohol-based resin layer before drying) are set depending on a type of the solvent in the coating liquid. A drying temperature is set, for example, to 50 to 200° C. and preferably to 60 to 150° C. When the solvent contains water, the drying temperature is preferably higher than or equal to 80° C. A time period for drying is set, for example, to 2 to 20 minutes.

In FIG. 4, two polyvinyl alcohol based resin layers 61 and 62 are formed on respective surfaces of substrate film 30. When polyvinyl alcohol-based resin layers are thus formed on both surfaces of substrate film 30, curling of the film that would occur during the production of a polarizing laminated film 300 (see FIG. 6) can be suppressed, and two polarizing plates can be obtained from a single polarizing laminated film 300. This is also advantageous for polarizing plate production efficiency. Without being limited as such, a polyvinyl alcohol-based resin layer may be formed on only one surface of substrate film 30.

In laminated film 100, polyvinyl alcohol-based resin layers 61 and 62 each have a thickness preferably from 3 to 30 μm and more preferably from 5 to 20 μm. When polyvinyl alcohol-based resin layers 61 and 62 have a thickness in this range, polarizers 51 and 52 that are well dyed with the dichroic dye, have high polarizing performance, and have a thickness less than or equal to 10 µm can be obtained through stretching step S20 and dyeing step S30 described below. If polyvinyl alcohol-based resin layers 61 and 62 have a thickness greater than 30 µm, polarizers 51 and 52 may have a thickness greater than 10 µm. If polyvinyl alcohol-based resin layers 61 and 62 have a thickness less than 3 µm, the stretched product can be too thin and tend to have poor dyeability.

Before the coating liquid is applied, the surface of substrate film 30 may be subjected to a corona treatment, a plasma treatment, a flame treatment, or other treatments for improving adhesiveness between substrate film 30 and polyvinyl alcohol-based resin layers 61 and 62.

Before the coating liquid is applied, polyvinyl alcohol-based resin layers 61 and 62 may be formed on substrate film 30 with a primer or adhesive layer being interposed in order to improve adhesiveness between substrate film 30 and polyvinyl alcohol-based resin layers 61 and 62.

[Primer Layer]

The primer layer can be formed by applying a primer layer-forming coating liquid to the surface of substrate film 30 and then drying the coating. The primer layer-forming coating liquid contains a component capable of providing relatively strong adhesion to both of substrate film 30 and polyvinyl alcohol-based resin layers 61 and 62. The primer layer-forming coating liquid normally contains a resin component capable of providing such adhesion and a solvent. The resin component is preferably a thermoplastic resin with a high level of transparency, thermal stability, and stretchability, such as a (meth)acrylic resin or a polyvinyl alcohol-based resin. In particular, a polyvinyl alcohol-based resin that provides good adhesion is preferably used.

Examples of the polyvinyl alcohol-based resin include a polyvinyl alcohol resin and derivatives thereof. Examples of derivatives of a polyvinyl alcohol resin include polyvinyl formal, polyvinyl acetal, and other derivatives obtained by modifying a polyvinyl alcohol resin with olefins such as ethylene and propylene; derivatives obtained by modifying a polyvinyl alcohol resin with unsaturated carboxylic acids such as acrylic acid, methacrylic acid, and crotonic acid; derivatives obtained by modifying a polyvinyl alcohol resin with an alkyl ester of an unsaturated carboxylic acid; and derivatives obtained by modifying a polyvinyl alcohol resin with acrylamide. Among the examples of the polyvinyl alcohol-based resin, a polyvinyl alcohol resin is preferably used.

A solvent to be used is normally a common organic or aqueous solvent capable of dissolving a resin component. Examples of the solvent include aromatic hydrocarbons such as benzene, toluene, and xylene; ketones such as acetone, methyl ethyl ketone, and methyl isobutyl ketone; esters such as ethyl acetate and isobutyl acetate; chlorinated hydrocarbons such as methylene chloride, trichloroethylene, and chloroform; and alcohols such as ethanol, 1-propanol, 2-propanol, and 1-butanol. It should be noted that an organic solvent in the primer layer-forming coating liquid may dissolve substrate film 30 in the process of forming the primer layer with the coating liquid. Therefore, the solvent should preferably be selected also in consideration of solubility of substrate film 30. In view also of environmental impact, the primer layer is preferably formed by using a coating liquid containing water as a solvent.

In order to increase strength of the primer layer, a cross-linking agent may be added to the primer layer-forming coating liquid. The cross-linking agent may be any appropriate one selected from among organic, inorganic, and other known cross-linking agents, depending on a type of the thermoplastic resin used. The cross-linking agent may be, for example, an epoxy-based cross-linking agent, an isocyanate-based cross-linking agent, a dialdehyde-based cross-linking agent, or a metal-based cross-linking agent.

The epoxy-based cross-linking agent may be any of a one-component curing type and a two-component curing type. Examples thereof include ethylene glycol diglycidyl ether, polyethylene glycol diglycidyl ether, glycerin di- or tri-glycidyl ether, 1,6-hexanediol diglycidyl ether, trimethylolpropane triglycidyl ether, diglycidyl aniline, and diglycidyl amine.

Examples of the isocyanate-based cross-linking agent include tolylene diisocyanate, hydrogenated tolylene diisocyanate, trimethylolpropane-tolylene diisocyanate adducts, triphenylmethane triisocyanate, methylenebis(4-phenylmethane) triisocyanate, isophorone diisocyanate, and ketoxime- or phenol-blocked products thereof.

Examples of the dialdehyde-based cross-linking agent include glyoxal, malondialdehyde, succindialdehyde, glutardialdehyde, maleindialdehyde, and phthaldialdehyde.

Examples of the metal-based cross-linking agent include metal salts, metal oxides, metal hydroxides, and organometallic compounds. Examples of metal salts, metal oxides, and metal hydroxides include salts, oxides, and hydroxides of di- or polyvalent metals such as magnesium, calcium, aluminum, iron, nickel, zirconium, titanium, silicon, boron, zinc, copper, vanadium, chromium, and tin.

The organometallic compound is a compound having at least one intramolecular structure in which an organic group is bonded directly to a metal atom or bonded to a metal atom with an oxygen atom, a nitrogen atom, or other atoms being interposed therebetween. The organic group means a monovalent or polyvalent group containing at least a carbon atom, such as an alkyl group, an alkoxy group, or an acyl group. The term "bond" means not only covalent bond but also coordinate bond as in chelate compounds.

Suitable examples of the organometallic compound include organotitanium compounds, organozirconium compounds, organoaluminum compounds, and organosilicon compounds. One organometallic compound may be used alone, or two or more organometallic compounds may be used in combination.

Examples of organotitanium compounds include titanium orthoesters such as tetra-n-butyl titanate, tetraisopropyl titanate, butyl titanate dimer, tetra(2-ethylhexyl) titanate, and tetramethyl titanate; titanium chelates such as titanium acetylacetonate, titanium tetraacetylacetonate, polytitanium acetylacetonate, titanium octyleneglycolate, titanium lactate, titanium triethanolaminate, and titanium ethylacetoacetate; and titanium acylates such as polyhydroxytitanium stearate.

Examples of organozirconium compounds include zirconium n-propionate, zirconium n-butyrate, zirconium tetraacetylacetonate, zirconium monoacetylacetonate, zirconium bisacetylacetonate, and zirconium acetylacetonate bisethylacetoacetate.

Examples of organoaluminum compounds include aluminum acetylacetonate and aluminum organic acid chelates. Examples of organosilicon compounds include compounds in which ligands listed above for the organotitanium compounds and the organozirconium compounds are bonded to silicon.

In addition to low-molecular-weight cross-linking agents shown above, a polymer cross-linking agent such as a methylolated melamine resin or a polyamide epoxy resin can also be used. Examples of commercially available products of the polyamide epoxy resin include Sumirez Resin 650 (30) and Sumirez Resin 675 (both of which are trademarks) available from Taoka Chemical Co., Ltd.

When a polyvinyl alcohol-based resin is used as a resin component to form the primer layer, a polyamide epoxy resin, a methylolated melamine resin, a dialdehyde-based cross-linking agent, or a metal chelate compound-based cross-linking agent is suitably used as the cross-linking agent.

A ratio between a resin component and a cross-linking agent in the primer layer-forming coating liquid may be as follows. Based on 100 parts by weight of the resin component, an amount of the cross-linking agent may appropriately be determined in a range approximately from 0.1 to 100 parts by weight depending on a type of the resin component or the cross-linking agent, and preferably selected within a range approximately from 0.1 to 50 parts by weight. The primer layer-forming coating liquid is preferably prepared so as to have a solid concentration of about 1 to about 25% by weight.

The primer layer preferably has a thickness approximately from 0.05 to 1 μm and more preferably from 0.1 to 0.4 μm. The primer layer with a thickness less than 0.05 μm will be less effective in improving adhesion between substrate film 30 and polyvinyl alcohol-based resin layers 61 and 62. The primer layer with a thickness greater than 1 μm is disadvantageous for reduction in thickness of the polarizing plate.

The primer layer-forming coating liquid may be applied to substrate film 30 by a method the same as that for the polyvinyl alcohol-based resin layer-forming coating liquid. The primer layer is applied to the surface to which the polyvinyl alcohol-based resin layer-forming coating liquid is to be applied (one or both surfaces of substrate film 30). A temperature and a time period for drying the coating layer of the primer layer-forming coating liquid are set depending on a type of the solvent in the coating liquid. A temperature for drying is set, for example, to 50 to 200° C. and preferably to 60 to 150° C. When the solvent contains water, the temperature for drying is preferably higher than or equal to 80° C. A time period for drying is set, for example, to 30 seconds to 20 minutes.

When the primer layer is provided, the steps of forming coatings on substrate film 30 may be performed in any order. For example, the process of forming polyvinyl alcohol-based resin layers on both surfaces of substrate film 30 may include forming the primer layers on both surfaces of substrate film 30 and then forming polyvinyl alcohol-based resin layers on both surfaces. Alternatively, the primer layer and the polyvinyl alcohol-based resin layer may sequentially be formed on one surface of substrate film 30, and then the primer layer and the polyvinyl alcohol-based resin layer may sequentially be formed on the other surface of substrate film 30.

(2) Stretching Step S20

Figure 5:
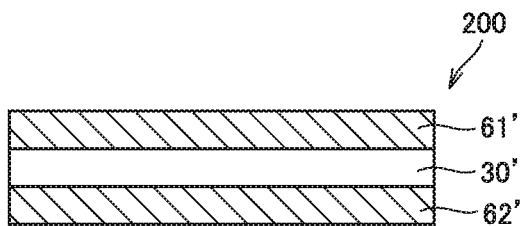
FIG. 5 is a schematic cross-sectional view showing an example of a layered structure of a stretched film obtained in a stretching step.

Referring to FIG. 5, the present step includes stretching laminated film 100 including substrate film 30 and polyvinyl alcohol-based resin layers 61 and 62 to obtain a stretched film 200 including a stretched substrate film 30' and stretched polyvinyl alcohol-based resin layers 61' and 62'. Stretching treatment is generally uniaxial stretching.

A stretch ratio to which laminated film 100 is stretched can be selected, as appropriate, depending on desired polarizing properties. The stretch ratio is preferably from more than 5 to less than or equal to 17 and more preferably from more than 5 to less than or equal to 8 relative to the original length of laminated film 100. If the stretch ratio is less than or equal to 5, polyvinyl alcohol-based resin layers 61 and 62 may fail to sufficiently be oriented so that polarizers 51 and 52 may fail to have a sufficiently high degree of polarization. On the other hand, if the stretch ratio exceeds 17, the film can easily be broken during stretching, and stretched film 200 may be thinner than necessary so that it may have lower workability and handleability in later steps.

A stretching treatment is not limited to single-stage stretching and can also be multi-stage stretching. In this case, the entire stretching treatment in multiple stages may continuously be performed before dyeing step S30, or the stretching treatment in second and later stretching stages may be performed simultaneously with a dyeing treatment and/or a cross-linking treatment in dyeing step S30. When the stretching treatment in multiple stages is performed as such, the stretching treatment is preferably performed in such a way that the cumulative stretch ratio of all stretching stages exceeds 5.

The stretching treatment may be longitudinal stretching that is performed in the longitudinal direction of the film (the film feed direction), transverse stretching that is performed in the widthwise direction of the film, or oblique stretching. Longitudinal stretching may be stretching between rolls that is performed by using rolls, compressing stretching, stretching with chucks (clips), or the like. Transverse stretching may be tentering or the like. The stretching treatment may be performed by using any of wet stretching and dry stretching. Use of dry stretching is preferred in that a temperature for stretching can be selected within a wide range.

A stretching temperature is set to be higher than or equal to a temperature at which polyvinyl alcohol-based resin layers 61 and 62 and substrate film 30 exhibit such fluidity that they can be stretched as a whole. The stretching temperature is preferably in the range from −30° C. to +30° C. representing a phase transition temperature (melting point or glass transition temperature) of substrate film 30, more preferably in the range from −30° C. to +5° C., and even more preferably in the range from −25° C. to +0° C. When substrate film 30 is composed of two or more resin layers, the phase transition temperature means the highest phase transition temperature of the phase transition temperatures of the two or more resin layers.

If the stretching temperature is lower than a phase transition temperature of −30° C., it may be difficult to achieve a high stretch ratio greater than 5, or substrate film 30 may have too low fluidity and tend to be difficult to be stretched. If the stretching temperature exceeds a phase transition temperature of +30° C., substrate film 30 may have too high fluidity and tend to be difficult to be stretched. The stretching temperature is more preferably higher than or equal to 120° C. in the above range, so that a high stretch ratio greater than 5 can more easily be achieved. This is because when the stretching temperature is higher than or equal to 120° C., the stretching treatment can be performed with no difficulty even at a high stretch ratio greater than 5.

The method of heating laminated film 100 in the stretching treatment may be a zone heating method (e.g., a method of heating in a stretching zone such as a heating furnace in which adjustment to a certain temperature has been made by blowing of hot air); a method of heating rolls themselves used for stretching; or a heater heating method (a method of heating with radiant heat from infrared heaters, halogen heaters, panel haters, or other heaters placed above and below laminated film 100). In the method of stretching between rolls, the zone heating method is preferred in view of stretching temperature uniformity. In this case, two nip roll pairs may be placed in or outside a temperature controlled stretching zone. Preferably, the two nip roll pairs are placed outside the stretching zone in order to prevent sticking between laminated film 100 and nip rolls.

In the case of the zone heating method, the stretching temperature means a temperature of an atmosphere in the zone (e.g., in a heating furnace). When heating is performed in a furnace in the heater heating method, the stretching temperature also means a temperature of an atmosphere in the furnace. In the method of heating rolls themselves, the stretching temperature means a temperature of a roll surface.

A preheating step of preheating laminated film 100 may be performed before stretching step S20. The preheating method may be the same as the heating method in the stretching treatment. When the stretching treatment is performed by stretching between rolls, preheating may be performed at any time before, while, or after the film passes between nip rolls on the upstream side. When the stretching treatment is performed with hot roll stretching, preheating is preferably performed before the film passes between hot rolls. When the stretching treatment is performed with stretching with chucks, preheating is preferably performed before a distance between the chucks is increased. A preheating temperature is preferably in a range from −50° C. to ±0° C. representing a stretching temperature and more preferably in a range from −40° C. to −10° C. representing a stretching temperature.

After the stretching treatment in stretching step S20, a heat setting step may be performed. Heat setting is a process of subjecting stretched film 200 to heat treatment at a temperature higher than or equal to a crystallization temperature while ends of stretched film 200 are held under tension with clips. Heat setting facilitates crystallization of polyvinyl alcohol-based resin layers 61' and 62'. A heat setting temperature is preferably in a range from −80° C. to −0° C. representing a stretching temperature and more preferably a range from −50° C. to −0° C. representing a stretching temperature.

(3) Dyeing Step S30

Figure 6:
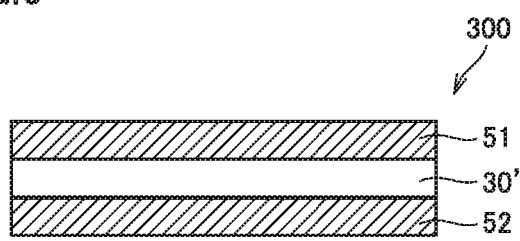
FIG. 6 is a schematic cross-sectional view showing an example of a layered structure of a polarizing laminated film obtained in a dyeing step.

Referring to FIG. 6, the present step includes dyeing polyvinyl alcohol-based resin layers 61' and 62' of stretched film 200 with a dichroic dye and adsorbing and orienting the dichroic dye to form polarizers 51 and 52. After the present step, polarizing laminated film 300 having substrate film 30' and polarizers 51 and 52 disposed on both surfaces thereof is obtained.

The dyeing step can be performed by immersing the entire stretched film 200 in a dichroic dye-containing solution (dyeing solution). The dyeing solution can be a solution obtained by dissolving the dichroic dye in a solvent. Water is generally used as the solvent for the dyeing solution. An organic solvent miscible with water may further be added to water. The dyeing solution preferably has a dichroic dye concentration from 0.01 to 10% by weight, more preferably from 0.02 to 7% by weight, and even more preferably from 0.025 to 5% by weight.

When iodine is used as the dichroic dye, an iodide is preferably further added to the iodine-containing dyeing solution so that dyeing efficiency can further be improved. Examples of the iodide include potassium iodide, lithium iodide, sodium iodide, zinc iodide, aluminum iodide, lead iodide, copper iodide, barium iodide, calcium iodide, tin iodide, and titanium iodide. The dyeing solution preferably has an iodide concentration from 0.01 to 20% by weight. Among the iodides, potassium iodide is preferably added. When potassium iodide is added, a weight ratio of iodine to potassium iodide is preferably in a range from 1:5 to 1:100, more preferably in a range from 1:6 to 1:80, and even more preferably in a range from 1:7 to 1:70.

Stretched film 200 is normally immersed in the dyeing solution for a time period in a range from 15 seconds to 15 minutes and preferably from 30 seconds to 3 minutes. A temperature of the dyeing solution is preferably in a range from 10 to 60° C. and more preferably in a range from 20 to 40° C.

Dyeing step S30 can also be performed before stretching step S20, or these steps can also be performed at the same time. Dyeing step S30 is preferably performed after at least a certain level of stretching is achieved for laminated film 100 so that the dichroic dye adsorbed to the polyvinyl alcohol-based resin layer can well be oriented. Specifically, dyeing step S30 can be performed on stretched film 200 obtained by performing stretching until a target ratio is attained in stretching step S20, or the stretching treatment can also be performed to a ratio lower than the target in stretching step S20 and then the stretching treatment can also be performed in dyeing step S30 until the total stretch ratio reaches the target ratio. The latter embodiment may be a process 1) that includes performing the stretching treatment to a ratio lower than the target in stretching step S20 and then performing the stretching treatment during the dyeing treatment in dyeing step S30 in such a way that the total stretch ratio reaches the target ratio. When a cross-linking treatment is performed after the dyeing treatment as described below, such an embodiment may also be a process 2) that includes performing the stretching treatment to a ratio lower than the target in stretching step S20, then performing the stretching treatment to such an extent that the total stretch ratio is still lower than the target ratio during the dyeing treatment in dyeing step S30, and then performing the stretching treatment during the cross-linking treatment in such a way that the total stretch ratio finally reaches the target ratio.

Dyeing step S30 can include a cross-linking treatment step that follows the dyeing treatment. The cross-linking treatment can be performed by immersing the dyed film in a cross-linking agent-containing solution (cross-linking solution). A conventionally known material can be used as the cross-linking agent, examples of which include a boron compound such as boric acid and borax, glyoxal, and glutaraldehyde. One cross-linking agent may be used alone, or two or more cross-linking agents may be used in combination.

The cross-linking solution can specifically be a solution obtained by dissolving a cross-linking agent in a solvent. For example, water can be used as the solvent. In addition to water, the solvent may further contain an organic solvent miscible with water. A concentration of the cross-linking agent in the cross-linking solution is preferably in a range from 1 to 20% by weight and more preferably in a range from 6 to 15% by weight.

The cross-linking solution can contain an iodide. Addition of an iodide allows polarizers 51 and 52 to have more uniform in-plane polarization performance. Examples of the iodide include potassium iodide, lithium iodide, sodium iodide, zinc iodide, aluminum iodide, lead iodide, copper iodide, barium iodide, calcium iodide, tin iodide, and titanium iodide. The cross-linking solution preferably has an iodide concentration from 0.05 to 15% by weight and more preferably from 0.5 to 8% by weight.

The dyed film is normally immersed in the cross-linking solution for a time period from 15 seconds to 20 minutes and preferably from 30 seconds to 15 minutes. A temperature of the cross-linking solution is preferably in a range from 10 to 90° C.

The cross-linking agent can be added to the dyeing solution so that the cross-linking treatment can be performed simultaneously with the dyeing treatment. The stretching treatment may also be performed during the cross-linking treatment. A specific embodiment in which the stretching treatment is performed during the cross-linking treatment is as described above. The treatment of immersion in the cross-linking solution may also be performed twice or more by using two or more cross-linking solutions different in composition.

After dyeing step S30, a washing step and a drying step are preferably performed before bonding step S40 described below. The washing step normally includes a water washing step. The water washing treatment can be performed by immersing the dyed or cross-linked film in pure water such as ion-exchanged water or distilled water. A water washing temperature is normally in a range from 3 to 50° C. and preferably in a range from 4 to 20° C. A time period of immersion in water is normally set to 2 to 300 seconds and preferably to 3 to 240 seconds.

The washing step may be a combination of the water washing step and the step of washing with an iodide solution. A washing liquid for use in the water washing step and/or the washing treatment with an iodide solution can contain water and optionally a liquid alcohol such as methanol, ethanol, isopropyl alcohol, butanol, or propanol.

The drying step performed after the washing step may be performed with any appropriate method such as air drying, air blow drying, or drying by heating. For example, in the case of drying by heating, a drying temperature is normally from 20 to 95° C., and a time period for drying is normally approximately from 1 to 15 minutes.

(4) Bonding Step S40

Figure 7:
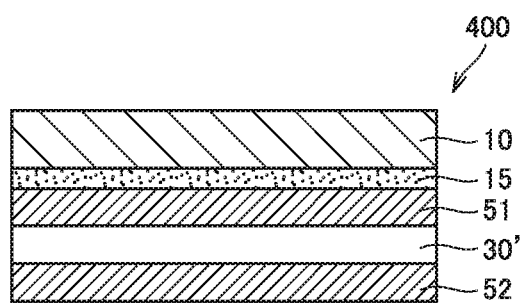
FIG. 7 is a schematic cross-sectional view showing an example of a layered structure of a laminate film obtained in a bonding step.

Referring to FIG. 7, the present step includes bonding protective film 10 onto polarizer 51 of polarizing laminated film 300, that is, to the surface of polarizer 51 opposite to substrate film 30' side, with an adhesive layer being interposed, to obtain a laminate film 400.

Protective film 10 is bonded to polarizer 51 with adhesive layer 15 being interposed. Bonding of a protective film with an adhesive layer being interposed is achieved, for example, by a bonding method with the use of a bonding roll by applying an adhesive to a bonding surface of protective film 10 and/or polarizer 51 with known means and layering protective film 10 and polarizer 5 with the layer of the applied adhesive being interposed.

When a photo-curable adhesive is used as the adhesive, bonding described above is followed by a curing step in which the photo-curable adhesive is cured by exposure to active energy rays. Though a type of the active energy rays is not particularly limited, active energy rays (ultraviolet rays) having a peak wavelength at a wavelength less than or equal to 400 nm are preferred and UV-B having a peak wavelength between 280 and 320 nm is more preferred.

Though a light source for active energy rays is not particularly limited, a high-pressure mercury lamp, a low-pressure mercury lamp, a medium-pressure mercury lamp, an ultrahigh-pressure mercury lamp, a chemical lamp, a black light lamp, a microwave-excited mercury lamp, or a metal halide lamp is preferably used.

Intensity of irradiation of the photo-curable adhesive with light is determined as appropriate depending on a composition of the photo-curable adhesive, and it is preferably set such that intensity of irradiation in a wavelength region effective for activation of the polymerization initiator is 0.1 to 6000 mW/cm$^2$. When irradiation intensity is higher than or equal to 0.1 mW/cm$^2$, a reaction time will not be too long, and when it is lower than or equal to 6000 mW/cm$^2$, heat radiated from the light source and generation of heat during curing of the photo-curable adhesive will be less likely to cause yellowing of the photo-curable adhesive or degradation of polarizers 51 and 52.

A time period of irradiation of the photo-curable adhesive with light is also determined as appropriate depending on a composition of the photo-curable adhesive. Preferably, the irradiation time period is set such that an integrated light amount expressed as the product of the irradiation intensity and the irradiation time period is 10 to 10000 mJ/cm$^2$. When the integrated light amount is greater than or equal to 10 mJ/cm$^2$, a sufficient amount of active species derived from the polymerization initiator can be produced so that curing reaction can be allowed to more reliably proceed. When it is less than or equal to 10000 mJ/cm$^2$, the irradiation time period will not be too long so that good productivity can be maintained.

Before protective film 10 is bonded to polarizer 51, a surface of protective film 10 on the side of polarizer 51 can be subjected to a surface treatment (adhesion promoting treatment) such as a plasma treatment, a corona treatment, an ultraviolet irradiation treatment, a flame treatment, or a saponification treatment in order to have improved adhesion to polarizer 51. In particular, a plasma treatment, corona treatment, or a saponification treatment is preferably performed. For example, when the protective film is composed of a cyclic polyolefin-based resin, a plasma treatment or a corona treatment is normally performed. When the protective film is composed of a cellulose ester-based resin, a saponification treatment is normally performed. The saponification treatment may be a method of immersing the film in an aqueous solution of an alkali such as sodium hydroxide or potassium hydroxide.

(5) Peeling Step S50

The present step includes peeling off substrate film 30' (and polarizer 52) from laminate film 400 obtained after the protective film is bonded. After this step, single side protective film-bearing polarizing plate 1 in which protective film 10 is disposed on one surface of polarizer 51 can be obtained.

The method of peeling off substrate film 30' is not particularly limited. Substrate film 30' can be peeled off by a method the same as in the step of peeling off a separator (release film) that is performed on a normal pressure-sensitive adhesive-bearing polarizing plate. Substrate film 30' may be peeled off immediately after bonding step S40. Alternatively, after bonding step S40, the film may be wound in a form of a roll, and then substrate film 30' may be peeled off while the roll is unwound in a later step.

<Suitable Embodiment in Production of Polarizer According to the Present Invention>

Though a method of achieving an absorbance of a polarizer defined in the present invention is not particularly restricted, an absorbance of a polarizer can efficiently be controlled, for example, by controlling an absorbance based on adjustment of a content of potassium iodide in a dyeing solution used in the dyeing step and/or controlling an absorbance based on adjustment of contents of boric acid and potassium iodide in a cross-linking solution used in the cross-linking step. An absorbance of a polarizer can efficiently be controlled also based on a temperature of a washing liquid and a time period of retention in the washing liquid used in the washing step after the cross-linking step in the dyeing step.

Though a content of potassium iodide in the dyeing solution is different depending of how to dye, an amount of potassium iodide is preferably less than or equal to 10 parts by weight, more preferably less than or equal to 7 parts by weight, and further preferably less than or equal to 5 parts by weight, with respect to 100 parts by weight of a solvent (such as water). By decreasing a content of potassium iodide in the dyeing solution, an absorbance of the polarizer is easily controlled within the range according to the present invention.

An absorbance of a polarizer can efficiently be controlled within the range according to the present invention by performing the cross-linking step including two stages with the use of two types of cross-linking baths (cross-linking solutions) and adjusting a ratio between a content of boric acid and a content of potassium iodide in the cross-linking solution in the second bath. Specifically, in the cross-linking solution in the second bath, with respect to 100 parts by weight of a solvent (such as water), a content of boric acid is preferably set to 5.0 to 10.0 parts by weight and a content of potassium iodide is preferably less than or equal to 10 parts by weight, more preferably less than or equal to 7 parts by weight, and further preferably less than or equal to 5 parts by weight. The content of boric acid and the content of potassium iodide correlate with each other. Specifically, when boric acid is relatively large in amount, an absorbance of the polarizer can efficiently be controlled by setting an amount of potassium iodide to be relatively small. In contrast, when boric acid is relatively small in amount, an absorbance of the polarizer tends to be controlled within the range according to the present invention even though the number of parts of potassium iodide is set to be relatively large.

Since a high temperature of a washing liquid used in the washing step facilitates control of an absorbance of a polarizer within the range according to the present invention, a temperature of the washing liquid is preferably not lower than 5° C. and more preferably not lower than 7° C. When a temperature of the washing liquid is excessively increased, such a disadvantage as a significantly blue hue in crossed nicols or yellowing in a heat resistance test is caused. Therefore, preferably, the washing step is performed in two stages by using a washing tank and a washing shower, a temperature of the washing liquid in the washing tank is set to be relatively low, and a temperature of the washing liquid injected from the washing shower is set to be relatively high. In this case, preferably, a temperature of the washing liquid in the washing tank is set to 5 to 13° C., and a temperature of the washing liquid injected from the washing shower is set to 13 to 20° C. A time period for the washing step is preferably set approximately to 5 to 60 seconds in total.

There are some other factors affecting an absorbance of a polarizer. Since an absorbance is varied also by such factors, simply satisfying the conditions above is not sufficient. Such factors include, for example, a stretch ratio, stretch neck-in, and a temperature for stretching.

Specifically, too high a stretch ratio leads to difficulty in control of an absorbance. Therefore, a final stretch ratio in total is preferably not higher than 6.0. Too low a ratio leads to unsuccessful formation of a complex. Therefore, a final stretch ratio in total is preferably not lower than 5.0. Too high a temperature for stretching leads to progress of crystallization of polyvinyl alcohol, which leads to difficulty in control of an absorbance of a polarizer. Therefore, a temperature for stretching is preferably 170° C. or lower.

The ranges listed here are merely by way of example. A final absorbance is determined by combination of the above. Therefore, even when some conditions for production are out of the range described above, a production condition for achieving an absorbance in the present invention can be found and an effect aimed by the present invention can be obtained in that case.

<Display Apparatus>

The polarizing plate according to the present invention can be applied to a display apparatus. Referring to FIG. 2, this display apparatus can include cell for display 4 and polarizing plate 1 according to the present invention described above, which is arranged on at least one surface of the cell.

Polarizing plate 1 can be arranged and bonded on cell for display 4 with the use of pressure-sensitive adhesive layer 2 provided on the outer surface of polarizer 5. In such a display apparatus, protective film 10 of polarizing plate 1 forms the outer surface (typically, the outermost surface) of the display apparatus.

The display apparatus is represented by a liquid crystal display apparatus in which cell for display 4 is implemented by a liquid crystal cell, however, it may be another display apparatus such as an organic EL apparatus. In the display apparatus, the polarizing plate should only be arranged on at least one surface of cell for display 4, however, it can also be arranged on both surfaces.

When a liquid crystal display apparatus is employed as the display apparatus, a polarizing plate is normally arranged on both surfaces of a liquid crystal cell. In this case, the polarizing plate according to the present invention may be employed for the polarizing plate on both surfaces or for the polarizing plate on only one surface. In the latter case, the polarizing plate according to the present invention may be provided on a front side (a viewing side) or on a rear side (a backlight side), with the liquid crystal cell being defined as the reference. A liquid crystal cell of a conventionally known type can be employed as the liquid crystal cell.

EXAMPLES

Hereinafter, the present invention will more specifically be described with reference to examples and comparative examples, however, the present invention is not limited to these examples and comparative examples.

Example 1

(1) Primer Layer Forming Step

Polyvinyl alcohol powders (Z-200 manufactured by The Nippon Synthetic Chemical Industry Co., Ltd., 1100 in average polymerization degree, 99.5 mol % in saponification degree) were dissolved in hot water at 95° C. to prepare a 3% by weight polyvinyl alcohol aqueous solution. A primer layer-forming coating liquid was obtained by mixing the resulting aqueous solution and a cross-linking agent (Sumirez Resin 650 manufactured by Taoka Chemical Co., Ltd.) at a ratio of 5 parts by weight of the cross-linking agent to 6 parts by weight of the polyvinyl alcohol powders.

Subsequently, a 90-μm-thick unstretched polypropylene (PP) film (melting point: 163° C.) was prepared as a substrate film, and opposing surfaces of the film were subjected to a corona treatment. The primer layer-forming coating liquid was applied to one corona-treated surface of the substrate film by using a micro-gravure coater, and then dried at 80° C. for 10 minutes to form a 0.2-μm-thick primer layer. The same primer layer was formed also on the opposite surface of the substrate film.

(2) Preparation of Laminated Film (Resin Layer Forming Step)

Polyvinyl alcohol powders (PVA 124 manufactured by KURARAY Co., Ltd., 2400 in average polymerization degree, 98.0-99.0 mol % in saponification degree) were dissolved in hot water at 95° C. to prepare an 8% by weight polyvinyl alcohol aqueous solution, which was used as a polyvinyl alcohol-based resin layer-forming coating liquid.

Using a lip coater, the polyvinyl alcohol-based resin layer-forming coating liquid was applied to the surface of the primer layer formed on each of both surfaces of the substrate film in step (1). The coating was then dried at 80° C. for 20 minutes to form a polyvinyl alcohol-based resin layer on the primer layer, so that a laminated film constituted of the polyvinyl alcohol-based resin layer, the primer layer, the substrate film, the primer layer, and the polyvinyl alcohol-based resin layer was obtained.

(3) Preparation of Stretched Film (Stretching Step)

Using a floating longitudinal uniaxial stretching machine, the laminated film prepared in step (2) was subjected to free-end uniaxial stretching to 5.8 times at 160° C. to form a stretched film. After stretching, the polyvinyl alcohol-based resin layers both had a thickness of 6.1 μm.

(4) Preparation of Polarizing Laminated Film (Dyeing Step)

The polyvinyl alcohol-based resin layer was dyed by immersing the stretched film prepared in step (3) for about 180 seconds in a dyeing aqueous solution at 30° C. containing iodine and potassium iodide (containing 0.6 parts by weight of iodine and 10 parts by weight of potassium iodide with respect to 100 parts by weight of water). Subsequently, the excess dyeing aqueous solution was washed away with pure water at 10° C.

Subsequently, the dyed film was immersed for 120 seconds in a first cross-linking aqueous solution at 78° C. containing boric acid (containing 9.5 parts by weight of boric acid with respect to 100 parts by weight of water) and then immersed for 60 seconds in a second cross-linking aqueous solution at 70° C. containing boric acid and potassium iodide (containing 9.5 parts by weight of boric acid and 4 parts by weight of potassium iodide with respect to 100 parts by weight of water) so that a cross-linking treatment was performed. Subsequently, the film was washed with pure water at 10° C. for 10 seconds and finally dried at 40° C. for 300 seconds, so that a polarizing laminated film constituted of the polarizer, the primer layer, the substrate film, the primer layer, and the polarizer was obtained. The polarizers both had a thickness of 6.7 μm.

(5) Preparation of Polarizing Plate (Bonding Step and Peeling Step)

A cyclic polyolefin-based resin film (ZD12 manufactured by Zeon Corporation and having a thickness of 50 μm) was prepared as a protective film to be arranged on the outer side (the viewing side) in arrangement of a polarizing plate on a cell for display. A light transmittance at a wavelength of 365 nm of this protective film was 2.6%. The light transmittance was measured with a spectrophotometer (UV2450) manufactured by Shimadzu Corporation.

After the bonding surface of this protective film was subjected to the corona treatment, a photo-curable adhesive (KR-70T manufactured by ADEKA Corporation) was applied to the corona treated surface with the use of a micro-gravure coater. The protective film was arranged on one polarizer of the polarizing laminated film prepared in (4) with the layer of the applied adhesive being interposed, and thereafter bonding with a bonding roll was carried out.

Then, by irradiating the photo-curable adhesive with ultraviolet rays (that is, the adhesive layer was irradiated with ultraviolet rays through two polarizers) from a side of the polarizer opposite to the protective film with the use of a high-pressure mercury lamp such that an accumulated quantity of UVB attained to 250 mJ/cm$^2$, the adhesive was cured to form the adhesive layer. A laminate film constituted of the layered structure of the protective film, the adhesive layer, the polarizer, the primer layer, the substrate film, the primer layer, and the polarizer was obtained (the bonding step).

Then, the layered structure of the substrate film, the primer layer, and the polarizer (the polarizer opposite to the protective film) was removed by peeling off from the obtained laminate film (the peeling step). The layered structure including the substrate film was readily peeled off and a single side protective film-bearing polarizing plate constituted of the layered structure of the protective film, the adhesive layer, the polarizer, and the primer layer was obtained.

<Examples 2 to 6 and Comparative Examples 1 to 4>

A polarizing laminated film and a polarizing plate were prepared as in Example 1 except for amounts of boric acid and potassium iodide contained in the second cross-linking aqueous solution (the number of parts per 100 parts by weight of water) and temperatures of a water washing tank and a water washing shower were set as shown in Table 1.

[Measurement of Absorbance of Polarizer]

The polarizer on one side of the polarizing laminated film (to which a protective film was not bonded) obtained in each of Examples 1 to 6 and Comparative Examples 1 to 4 was peeled off from the substrate film and an absorbance of the polarizer which remained on the substrate film (that is, a sample film constituted of the layered structure of "the substrate film, the primer layer, and the polarizer") was measured. An absorbance was measured with an absorption photometer (V7100 manufactured by JASCO Corporation), and measurement at each wavelength from 280 nm to 320 nm was conducted. V7100 of a type capable of measurement in an ultraviolet region (in which quartz glass was adopted for a material for a window) was employed. In measurement at each wavelength from 280 nm to 320 nm, V7100 was provided with a Glan-Thompson prism as a polarized light separating element. An average value of a transmittance observed when a sample film was arranged to be located at a position in crossed nicols with respect to the Glan-Thompson prism and a transmittance observed when the sample film in that state was arranged as being turned by 90 degrees was calculated, and the average value was defined as the transmittance of the sample.

An absorbance at each wavelength was calculated by using an expression below.

Absorbance at each wavelength=−log$_{10}$(transmittance (%) at each wavelength/100)

A maximum value of absorbances from a wavelength of 280 nm to a wavelength of 320 nm was adopted as the maximum absorbance of that sample. Table 1 shows a maximum absorbance of each sample film.

[Grid Adhesiveness Test]

The surface of the polarizing plate obtained in each of Examples 1 to 6 and Comparative Examples 1 to 4 opposite to the protective film was bonded to a glass plate with the use of a pressure-sensing adhesive (P-3132 manufactured by Lintec Corporation). Cuts in grids were made only in the protective film from the side of the protective film with the use of a blade of a cutter such that 100 grids of 1-mm square were formed. Then, a cross-cut test defined under "JIS D0202 4.15 Grid Adhesiveness Test Method" was conducted. Table 1 shows the number of grids which remained without being peeled off after the test.

[Moist Heat Resistance Test]

In order to evaluate a monomer reaction rate of a photo-curable adhesive in an adhesive layer, a moist heat resistance test was conducted. When an unreacted monomer remains in the adhesive layer, decoloration of the polarizer occurs in the moist heat resistance test. The surface of the polarizing plate obtained in each of Examples 1 to 6 and Comparative Examples 1 to 4 opposite to the protective film was bonded to an alkali-free glass plate with the use of a pressure-sensitive adhesive (P-3132 manufactured by Lintec Corporation) and thereafter the glass plate was left for 48 hours in an environment at a temperature of 80° C. and a humidity of 90% RH.

Thereafter, a similar polarizing plate which was not subjected to the moist heat test was bonded to a surface of alkali-free glass opposite to the tested polarizing plate such that crossed nicols relation was satisfied therebetween, and observation was conducted on a backlight in a darkroom. The polarizing plate which experienced color loss lost the color to such an extent that it was clear and colorless and light totally leaked. In contrast, the polarizing plate in which no color loss occurred remained black with an initial state being maintained. Table 1 shows results of observation.

TABLE 1

| | Second Cross-Linking Aqueous Solution | | Temperature of Water Washing Tank (° C.) | Temperature of Water Washing Shower (° C.) | Maximum Absorbance | Grid Adhesiveness Test (The Number of Grids Which Remained in Cross-Cut Test) | Moist Heat Resistance Test |
|---|---|---|---|---|---|---|---|
| | Amount of Boric Acid (Parts) | Amount of Potassium Iodide (Parts) | | | | | |
| Example 1 | 9.5 | 4.0 | 10 | 15 | 0.64 | 100 | No Decoloration |
| Example 2 | 9.5 | 5.0 | 10 | 15 | 0.65 | 100 | No Decoloration |
| Example 3 | 9.5 | 5.0 | 8 | 15 | 0.66 | 100 | No Decoloration |
| Example 4 | 8.0 | 7.0 | 10 | 15 | 0.64 | 100 | No Decoloration |
| Example 5 | 7.0 | 7.5 | 10 | 15 | 0.62 | 100 | No Decoloration |
| Example 6 | 9.5 | 7.0 | 13 | 15 | 0.68 | 100 | No Decoloration |
| Comparative Example 1 | 9.5 | 10.0 | 10 | 10 | 0.72 | 83 | Decoloration |
| Comparative Example 2 | 9.5 | 7.5 | 8 | 8 | 0.72 | 85 | Decoloration |
| Comparative Example 3 | 9.5 | 8.0 | 10 | 10 | 0.71 | 81 | Decoloration |
| Comparative Example 4 | 9.5 | 15.0 | 10 | 10 | 0.75 | 72 | Decoloration |

REFERENCE SIGNS LIST

1 polarizing plate; 10 protective film; 15 adhesive layer; 2 pressure-sensitive adhesive layer; 30 substrate film; 30' stretched substrate film; 4 cell for display; 5, 51, 52 polarizer; 61, 62 polyvinyl alcohol-based resin layer; 61', 62' stretched polyvinyl alcohol-based resin layer; 100 laminated film; 200 stretched film; 300 polarizing laminated film; 400 laminate film.

The invention claimed is:

1. A polarizing plate comprising:
   a polarizer having a maximum absorbance at wavelengths from 280 to 320 nm which is less than or equal to 0.70; and
   a protective film disposed on the polarizer with an adhesive layer of a cured product of a photo-curable adhesive being interposed, a light transmittance at a wavelength of 365 nm of the protective film being less than 5%.

2. The polarizing plate according to claim 1, wherein the photo-curable adhesive contains a photopolymerization initiator having a maximum absorption wavelength within a range from 280 to 320 nm.

3. The polarizing plate according to claim 2, wherein the polarizer has a thickness less than or equal to 10 µm.

4. The polarizing plate according to claim 1, wherein the polarizer has a thickness less than or equal to 10 µm.

5. The polarizing plate according to claim 1, wherein
   the protective film is composed of a thermoplastic resin selected from the group consisting of a polyolefin-based resin, a polyester-based resin, a (meth)acrylic resin, and a mixture thereof.

6. A method of manufacturing the polarizing plate according to claim 1, the method comprising:
   irradiating the photo-curable adhesive with ultraviolet rays UV-B from a side of the polarizer while the protective film is disposed on the polarizer with the photo-curable adhesive being interposed.

7. A laminate film comprising:
   a polarizing laminated film; and
   a protective film,
   the polarizing laminated film including a substrate film and a polarizer provided on each of opposing surfaces of the substrate film,
   at least one of the polarizers having a maximum absorbance at wavelengths from 280 to 320 nm being less than or equal to 0.70,
   the protective film being disposed on one of the polarizers provided on the polarizing laminated film with an adhesive layer of a cured product of a photo-curable adhesive being interposed, and
   a light transmittance at a wavelength of 365 nm of the protective film being less than 5%.

8. A method of manufacturing a polarizing plate, the method comprising
   peeling off the substrate film and the other one of the polarizers provided in the polarizing laminated film from the laminate film according to claim 7.

9. A method of manufacturing the laminate film according to claim 7, the method comprising:

irradiating the photo-curable adhesive with ultraviolet rays UV-B from a side of the other one of the polarizers provided in the polarizing laminated film while the protective film is disposed on the one polarizer with the photo-curable adhesive being interposed.

* * * * *